United States Patent [19]

Kawamura et al.

[11] Patent Number: 4,777,203
[45] Date of Patent: Oct. 11, 1988

[54] MOLDING RESIN COMPOSITION

[75] Inventors: Takanobu Kawamura; Tamihiro Oohashi; Shinji Chiku, all of Ichiharashi, Japan

[73] Assignee: Chisso Corporation, Japan

[21] Appl. No.: 24,962

[22] Filed: Mar. 12, 1987

[30] Foreign Application Priority Data

Mar. 18, 1986 [JP] Japan .................................. 61-60082
Mar. 18, 1986 [JP] Japan .................................. 61-60083

[51] Int. Cl.$^4$ ...................... C08L 23/16; C08L 53/02; C08K 5/36
[52] U.S. Cl. .................................... 524/289; 524/505; 525/89; 525/95; 525/98; 525/193
[58] Field of Search ............................. 525/89, 98, 95; 524/505, 381, 384, 349, 289

[56] References Cited

U.S. PATENT DOCUMENTS

| | | | |
|---|---|---|---|
| 4,363,885 | 12/1982 | Fukui et al. | 525/89 |
| 4,371,662 | 2/1983 | Tone et al. | 525/89 |
| 4,386,125 | 5/1983 | Shiraki et al. | 525/89 |
| 4,412,016 | 10/1983 | Fukui et al. | 525/89 |
| 4,657,970 | 4/1987 | Shiraki et al. | 525/98 |

FOREIGN PATENT DOCUMENTS 0168203  1/1986  European Pat. Off. .

Primary Examiner—Allan M. Lieberman
Attorney, Agent, or Firm—Leydig, Voit & Mayer

[57] ABSTRACT

A molding thermoplastic, elastomeric resin composition having superior flexibility, impact resistance, mechanical strengths and moldability is provided, which composition comprises (1) a block copolymer expressed by the formula B-A-B' (wherein A is a conjugated diene polymer block and B and B' each are an aromatic vinyl compound polymer block of a specified molecular weight and are the same or different and contained in the copolymer in a specified proportion); a non-crystalline ehtylene-α-olefin random copolymer; a propylene-ethylene block coplymer and/or a crystalline propylene-ethylene random copolymer; and a specified phenolic antioxidant, or (2) a specified proportion of a hydrogenated derivative of a block copolymer expressed by the formula B-A-B' wherein A, B and B' are as defined above, and having a specified solution viscosity and a specified proportion of a crystalline propylene-ethylene random copolymer having a specified flexural modulus.

4 Claims, No Drawings

MOLDING RESIN COMPOSITION

BACKGROUND OF THE INVENTION

This invention relates to a molding thermoplastic, elastomeric resin composition having superior characteristics.

In recent years, thermoplastic elastomers having rubber elasticity even when uncured and also having thermoplasticity have been noted in the fields of parts for automobiles, domestic appliances and their parts, wire coating materials, footwears, materials for asphalt pavement, etc.

As such thermoplastic elastomers, polyolefin elastomers, polystyrene elastomers, etc. have so far been known.

Polystyrene elastomers, particularly styrene-butadiene block copolymer (SBS) and styrene-isoprene block copolymer (SIS) have a superior flexibility and a good rubber elasticity, but since they contain double bonds therein, their heat stability (heat deterioration and thermal-oxidative deterioration) and weather resistance are insufficient.

Thus, in order to improve such insufficient characteristics of the polystyrene elastomers, there have been employed or proposed ① a process of hydrogenating the double bonds inside the molecules of styrene-conjugated diene block copolymers, ① a process of reacting the double bonds within the molecules with each other by adding a free-radical generator or a crosslinking agent to form a reticular structure inside the molecules, and the like processes.

In any of these processes, it is intended to reduce the quantity of the double bonds inside the block copolymers or make it zero.

However, the thermoplastic elastomers obtained according to the process ① are superior in heat stability and molding-and processing properties, but since the hydrogenation process relies on a solution process, the operation is complicated and the hydrogenation cannot be easily effected. Moreover, the hydrogenated thermoplastic elastomers are regarded as exhibiting not as good rubber elasticity as compared with unhydrogenated thermoplastic elastomers.

On the other hand, the thermoplastic elastomers obtained according to the process ② have drawbacks in that notable reduction in the flowability and inferior appearance of the resulting molded products, such as silver streaks, occur.

Further, as to the polyolefin thermoplastic elastomers, it has been known that when a hydrogenated derivative of styrene-butadiene-styrene block copolymers is blended with a propylene polymer, a composition having a good flexibility and also high mechanical strengths is obtained.

However, when a hydrocarbon oil used as a softening agent is further added to the above-mentioned composition in order to improve its flowability, the composition is reduced in mechanical strength.

Further, if propylene homopolymer is blended with the above-mentioned composition, good rubber-elasticity is hindered and high-impact properties at low temperatures are insufficient.

In the case of the composition of a propylene-ethylene block copolymer with a hydrogenated derivative of a styrene-conjugated diene copolymer, as the quantity of the hydrogenated derivative of a styrene-conjugated diene block copolymer in the blend increases, flow marks appear on the surface of the resulting molded product to yield a molded product having an inferior appearance.

On the other hand, in the case of a polyolefin elastomer obtained by blending a propylene polymer with a non-crystalline ethylene-propylene random copolymer, the elastomer has a good rubber elasticity, but its mold-release characteristics during the molding process are inferior, and in the case of those containing a large quantity of the non-crystalline ethylene-propylene random copolymer, there often occurs no mold release.

SUMMARY OF THE INVENTION

The present invention has been made based on the above-mentioned situations.

The object of the present invention is to provide a molding thermoplastic, elastomeric resin composition having a good flexibility and superior high-impact properties, mechanical characteristics, moldability, etc.

The present invention in a first aspect resides in a molding elastomeric resin composition comprising a block copolymer (hereinafter referred to often as a first component) expressed by the formula (I)

wherein A represents a conjugated diene polymer block and B and B' each represent an aromatic vinyl compound polymer block having a number-average molecular weight of 5,000 to 125,000, B and B' being the same or different and the total weight of B and B' being contained in the copolymer in a proportion of 5 to 50% by weight; a non-crystalline ethylene-α-olefin random copolymer wherein the carbon number of the α-olefin is 3 or more (hereinafter referred to often as a second component); a propylene-ethylene block copolymer and/or a crystalline propylene-ethylene random copolymer (hereinafter referred to often as a third component); and a phenolic antioxidant expressed by the formula (II)

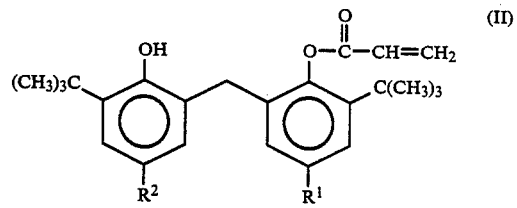

wherein $R^1$ and $R^2$ each represent a lower alkyl group of 1 to 4 carbon atoms.

The present invention in a second aspect resides in a molding elastomeric composition comprising 10 to 50% by weight of a hydrogenated derivative (hereinafter referred to often as a fourth component) of a block copolymer expressed by the formula (III)

wherein A represents a conjugated diene polymer block and B and B' each represent an aromatic vinyl compound polymer block, and having a solution viscosity of 800 cps or less as measured in a 20% by weight toluene solution at 25° C., and 50 to 70% by weight of a crystalline propylene-ethylene random copolymer (hereinafter referred to often as a fifth component) having a flexural modulus of 3,000 to 9,000 Kg f/cm².

DETAILED DESCRIPTION OF PREFERRED EMBODIMENTS

The block copolymer having a structure of B—A—B' of the formula (I) (a first component) generally has a two-phase structure consisting of the conjugated diene polymer block A and the polymer blocks B and B', and since the conjugated diene polymer block A is incompatible with the respective polymer blocks B and B', a structure is formed wherein the polymer blocks B and B' are respectively dispersed between the phases of the conjugated diene polymer A. Further, in this first component, since the polymer blocks B and B' each have a stiffness, these constitute physical crosslinks to develop a rubbery structure.

Thus, as the conjugated diene polymer block A, those having a structure obtained by polymerizing one or two kinds of butadiene, isoprene, neoprene, etc., are herein enumerated. In the present invention, as the conjugated diene polymer block A, polybutadiene block is preferred.

Further, the polymer blocks B and B' each have a structure obtained by polymerizing an aromatic vinyl compound, and polystyrene structure is preferred.

Further, in this first component, the polymer block B and B' each have a number-average molecular weight of 5,000 to 125,000, particularly 8,000 to 50,000.

If the number-average molecular weight is less than 5,000, the rubber elasticity cannot be developed, while if it exceeds 125,000, the resulting block copolymer is too stiff.

Further, in the present invention, it is important that the block copolymer having the structure of B—A—B' contains the polymer blocks B and B' in a proportion of 5 to 50% by weight, preferably 20 to 40% by weight therein.

If the content of the polymer blocks B and B' is lower than 5% by weight, physical crosslinks of this block copolymer are not realized; hence development of rubber elasticity is inferior. If the content is higher than 50% by weight, the resulting molding resin composition is too stiff.

The blending proportion of the first component in the total weight of the first, second and third components is in the range of usually 1 to 50% by weight, particularly preferably 10 to 40% by weight.

If the blending proportion is less than 1% by weight, the resulting composition often cannot exhibit a sufficient flexibility, while if it exceeds 50% by weight, the resulting composition is often reduced in mechanical strength, particularly the tensile strength, and inferior in high-temperature stiffness.

Next, the non-crystalline ethylene-α-olefin random copolymer as the second component imparts flexibility an high-impact properties to the molding resin composition.

The α-olefins constituting the second component are those having 3 or more carbon atoms, particularly 3 to 18 carbon atoms, and specific examples thereof are propylene, 1-butene, 1-pentene, 1-hexene, 4-methyl-1-pentene, 1-heptene, 1-octene, 1-nonene, 1-decane, etc.

Further, the α-olefin in the second component may be alone or in admixture of two or more kinds.

The second component is preferred to be non-crystalline ethylene-propylene random copolymer.

When the second component is non-crystalline ethylene-propylene random copolymer, the ethylene content is in the range of 25 to 75% by weight, particularly preferably 25 to 50% by weight.

The blending proportion of the second component in the total of the first, second and third components is 50% by weight or less. If the blending proportion exceeds 50% by weight, the mechanical strength and high-temperature stiffness of the resulting composition may often be reduced.

The above third component is considered to function as a hard segment in the molding resin composition, and it adjusts the hardness of the molding resin composition and at the same time improves its mechanical strength.

As the third component, propylene-ethylene block copolymer, crystalline propylene-ethylene random copolymer or the mixture thereof is used, and in any of these, the density is preferred to be in the range of 0.885 to 0.910 g/cm$^3$.

Further, the third component is preferred to have a melt flow rate (MFR) [JIS K 6758, 230° C.] expressing its molecular weight, of 0.5 to 100 g/10 min., preferably 1 to 60 g/10 min.

In the case of propylene-ethylene block copolymer, the ethylene content therein is usually in the range of 5 to 20% by weight, preferably 5 to 15% by weight, more preferably 7 to 13% by weight, while in the case of crystalline propylene-ethylene random copolymer, the ethylene content is in the range of 1 to 10% by weight, preferably 3 to 8% by weight, more preferably 4 to 8% by weight. Further, this crystalline propylene-ethylene random copolymer also includes a crystalline propylene-ethylene-butene random terpolymer having a butene content of 1 to 5% by weight and an ethylene content of 1 to 5% by weight.

The blending proportion of the third component in the total of the first, second and third components is usually in the range of 40 to 90% by weight, particularly preferably 50 to 70% by weight.

If the blending proportion is less than 40% by weight, the mechanical strength, particularly tensile strength, of the resulting resin composition may often be reduced, while if it exceeds 90% by weight, the hardness of the resulting composition may often be too high.

In the formula (II) expressing the above phenolic antioxidant, $R^1$ and $R^2$ each concretely represent any one of methyl group, ethyl group, propyl group, isopropyl grou and butyl group, and $R^1$ and $R^2$ may be the same or different group.

Among the above phenolic antioxidants, those wherein $R^1$ and $R^2$ each are methyl group or ethyl group are preferred, and as such, e.g. "Sumilizer GM" (trademark of product made by Sumitomo Chemical Company, Limited) as a commercially available product may be used.

The phenolic antioxidant has functions of improving the heat stability of the resulting molding resin composition and besides, retaining the good elastomeric properties of the composition.

Thus, in order for such properties to be sufficiently exhibited, the blending proportion of the phenolic antioxidant is preferred to be usually in the range of 0.01 to 5 parts by weight, particularly 0.05 to 1 part by weight, based on 100 parts by weight of the total of the first, second and third components.

In addition, in the present invention, other antioxidants may be, if necessary, used together with the phenolic antioxidant expressed by the formula (II).

As such other antioxidant, an antioxidant expressed by the formula (IV)

$$R^3-S-CH_2CH_2COOCH_2)_4C \qquad (IV)$$

wherein $R^3$ represents an alkyl group of 4 to 20 carbon atoms, is preferred. When this antioxidant is used together with the above phenolic antioxidant, it is possible to obtain a superior heat stability as a synergistic effect, over the sum of the heat stabilities of the respective compositions obtained when these stabilizers are singly blended, respectively.

Further, the above-mentioned hydrogenated derivative as the fourth component is a product obtained by hydrogenating the unsaturated bonds contained in the conjugated diene polymer block A and the aromatic vinyl compound polymer blocks B and B' in the above-mentioned formula (III).

The process for hydrogenating the block copolymer expressed by the above formula (III) can be suitably carried out according to a known process e.g. described in Japanese patent publication No. Sho 42-8704/1967 or Japanese patent publication No. Sho 43-6636/1968; thus its detailed description is omitted herein.

As the conjugated diene polymer block A in the above formula (III), a block having a structure as obtained by polymerizing one or two kinds of conjugated dienes such as butadiene, isoprene, neoprene, etc. is illustrated. In the present invention, polybutadiene block is preferred as the conjugated diene polymer block A.

Further, the above-mentioned polymer block B and B' have a structure as obtained by polymerizing an aromatic vinyl compound, and a polystyrene structure is preferred.

Further, the hydrogenated derivative of the block copolymer has a solution viscosity of 800 cps or less, preferably 600 cps or less, as measured in a 20% by weight toluene solution at 25° C. If a hydrogenated derivative having a solution viscosity exceeding 800 cps is blended, the compatibility thereof with the crystalline propylene-ethylene random copolymer as the fifth component is inferior so that flow marks appear on the surface of the resulting molded product or the flowability of the composition when melted lowers.

The blending proportion of the hydrogenated derivative in the molding elastomeric composition is usually in the range of 10 to 50% by weight, preferably 15 to 45% by weight.

If the blending proportion is less than 10% by weight, the resulting composition is often inferior in the moldability such as mold-release characteristics, while if it exceeds 50% by weight, flow marks often appear on the surface of the molded product obtained from the composition.

The crystalline propylene-ethylene random copolymer as the fifth component is considered to function as a hard segment in the molding elastomeric composition.

The crystalline propylene-ethylene random copolymer as the fifth component has a melt flow rate (MFR) [according to JIS K 6758] expressing its molecular weight, of usually 1 to 100 g/10 min., preferably 10 to 60 g/10 min., more preferably 20 to 60 g/10 min. If a crystalline propylene-ethylene random copolymer having a MFR less than 1 g/10 min. is blended, the flowability of the molten composition may be inferior so that molding of a large size molded product such as a bumper is difficult, while if the MFR exceeds 100 g/10 min., the high-impact properties of the resulting molded product are reduced.

The crystalline propylene-ethylene random copolymer as the fifth component is preferred to have as its characteristics, a flexural modulus of 3,000 to 9,000 Kgf/cm$^2$, particularly 5,000 to 8,000 Kg f/cm$^2$. Further the crystalline propylene-ethylene random copolymer of the present invention also includes a crystalline propylene-ethylene-butene random terpolymer having a flexural modulus of 3,000 to 9,000 Kg f/cm$^2$.

In the case where a crystalline propylene-ethylene random copolymer having a flexural modulus exceeding 9,000 Kg f/cm$^2$ is blended, if the blending proportion of the hydrogenated derivative of the block copolymer expressed by the formula (III), as the fourth component, is in the range of 50% by weight or less, an elastomeric composition having a good flexibility is often not obtained; in addition, in order to prepare an elastomeric composition having a good flexibility, if the hydrogenated derivative of the block copolymer is blended in a blending proportion exceeding 50% by weight, the mold-release characteristics are often inferior and flow marks appear on the surface of the resulting molded product. Further, if a crystalline propylene-ethylene random copolymer having a flexural modulus less than 3,000 Kg f/cm$^2$ is blended as the fifth component, the mechanical strength of the resulting molded product is reduced and the mold-release characteristics at the time of molding are inferior.

The blending proportion of the crystalline propylene-ethylene random copolymer as the fifth component in the molding elastomeric composition is in the range of usually 50 to 70% by weight, preferably 55 to 65% by weight.

If the blending proportion is less than 50% by weight, the appearance of the molded product is often inferior, while it exceeds 70% by weight, high-impact properties at low temperatures of the molded product using the composition is reduced.

As to the molding elastomeric composition of the present invention, when 10 to 50% by weight of the hydrogenated derivative of the block copolymer is blended with 50 to 70% by weight of the crystalline propylene-ethylene random copolymer, the resulting elastomeric composition exhibits good mechanical characteristics, and when a non-crystalline ethylene-α-olefin random copolymer is further blended with the above two components, it is possible to improve the tear strength of the molding elastomeric composition.

The α-olefin contained in such a non-crystalline ethylene-α-olefin random copolymer includes α-olefins of 3 carbon atoms or more, particularly 3 to 18 carbon atoms. Concrete examples thereof are propylene, 1-butene, 1-pentene, 1-hexene, 4-methyl-1-pentene, 1-heptene, 1-octene, 1-nonene, 1-decene, etc.

Further, the α-olefin in the non-crystalline ethylene-α-olefin random copolymer may be a single α-olefin or a mixture of two or more kinds of α-olefins.

Further, the non-crystalline ethylene-α-olefin random copolymer may contain a slight quantity of a diene component.

A preferred non-crystalline ethylene-α-olefin random copolymer is a non-crystalline ethylene-propylene random copolymer.

The ethylene content in the non-crystalline ethylene-propylene random copolymer is in the range of usually 25 to 75% by weight, preferably 25 to 50% by weight.

The blending proportion of the non-crystalline ethylene-α-olefin random copolymer in the molding elastomeric composition is 30% by weight or less. If the blending proportion exceeds 30% by weight, the moldability, particularly the mold-release characteristics of the resulting composition are often inferior.

Further, in the present invention, it is possible, if necessary, to adequately add and blend various additives such as an antioxidant, antistatic agent, coloring agent, flame retardant, flame-retardant adjunct, UV ray absorber, plasticizer, inorganic filler, softening agent for non-aromatic rubber, etc. as far as their addition does not hinder the effectiveness of the present invention.

Examples of the antioxidant are alkylphenols, 2,6-di-t-butyl-p-cresol, bisphenol A, amines, quinons, etc. Examples of the antistatic agent are various kinds of surfactants. Examples of the coloring agent are difficultly water-soluble azo dyes, red coloring agent, cadmium yellow, cream yellow, titanium white, etc. Examples of the flame retardant are organic halogen-containing flame retardants such as decabromodiphenyl oxide, decachlorododecahydrodimethanodibenzocyclooctene, etc. Examples of the flame retardant adjunct are antimony oxide, antimony sulfide, zirconium oxide, etc. Examples of the plasticizer are phthalic acid diesters, adipic acid diesters, phosphoric acid diesters, etc. Examples of the inorganic filler are calcium carbonate, gypsum, talc, mica, barium sulfate, glass fibers, wollastonite, magnesium hydroxide, aluminium hydroxide, etc. Examples of the softening agent for non-aromatic rubber are extender for EPDM, mineral softening agent for rubber called process oil, etc.

The molding resin composition of the present invention can be produced by blending the above-mentioned first, second and third components and a phenolic antioxidant expressed by the formula (II) and if desired, further the above-mentioned various additives.

The blending process has no particular limitation; for example, the total components may be blended all at once, or a phenolic antioxidant expressed by the formula (II) may be blended with the third component to prepare a master batch, followed by blending this master batch with the first and second components.

Further, the molding elastomeric composition of the present invention can be produced by blending the above-mentioned hydrogenated derivative of a block copolymer as the fourth component with the above-mentioned crystalline propylene-ethylene random copolymer as the fifth component and if required, further with the above-mentioned non-crystalline ethylene-α-olefin random copolymer and the above-mentioned additives.

In any case, the blending may be carried out by means of e.g. ribbon blender, tumbler mixer, Henschel mixer (trademark), super mixer, open rolls, Banbury mixer, single screw extruder, twinscrew extruder, single reciprocating screw kneader, etc.

The thus obtained molding resin composition and molding elastomeric composition are molded into various molded products according to various molding processes such as injection molding, vacuum molding, compression molding, extrusion molding, etc.

The molding resin composition and molding elastomeric composition can be suitably used for molding e.g. automobile parts such as bumper, OA apparatus such as housing, domestic appliance, wire coating material, footwear such as shoe soles, etc.

Since the molding resin composition of the present invention is obtained by blending a specified block copolymer having a two-phase structure consisting of plastic phase and rubber phase, a specified non-crystalline random copolymer, a propylene-ethylene block copolymer and/or a crystalline propylene-ethylene random copolymer and a specified phenolic antioxidant, the composition is moldable into a molded product having a good flexibility, superior high-impact properties, mechanical strength and molding processability and a good appearance.

Further, since the molding composition of the present invention is also obtained by blending a specified hydrogenated derivative of a block copolymer having a two-phase structure consisting of plastic phase and rubber phase with a crystalline propylene-ethylene random copolymer in a specified proportion, the composition is also moldable into a molded product having a good flexibility, superior high-impact properties, mechanical strength and molding processability and a good appearance.

The present invention will be described in more detail by way of Examples and Comparative examples. In addition, the present invention should not be construed to be limited thereto, but it can be, of course, optionally carried out within the scope of the present invention.

EXAMPLES 1~8 AND COMPARATIVE EXAMPLES 1~6

The first, second and third components of kinds and quantities indicated in Table 1 and phenolic antioxidants of kinds and quantities indicated in Table 1 were stirred by means of Henschel mixer (trademark) for 3 minutes, followed by extruding the resulting mixture by means of a single screw extruder (manufactured by Thermoplastic Company) at 200° C. into pellets. With the pellets, measurement of melt flow rate (MFR) shown below was carried out, and further, various test pieces were prepared therefrom and subjected to various tests.

Further, in Comparative examples 1~6, the respective components of kinds and quantities indicated in Table 1 were stirred in the same manner as in Examples 1~8 to obtain pellets. With the pellets, various tests of melt flow rate and others were caried out. The results of the respective Examples and Comparative examples are shown in Table 1.

In addition, the respective components used in the respective Examples and Comparative examples and the testing methods employed therein will be described below.

With regard to blending components:

The first component
  SBS copolymer ("TUFPRENE-A" a trademark of a product manufactured by Asahi Chemical Industry Co., Ltd.; styrene-butadiene ratio=40:60, MI (ASTM-D-1238, E condition)=2.6 g/10 min.).

The second component
  Non-crystalline ethylene-propylene random copolymer ("EPO2P", tradename of a product manufactured by Japan Synthetic Rubber Co., Ltd.; MFR (JIS-K-6758)=3.6 g/10 min., Mooney viscosity=24).

The third component
  Propylene-ethylene block copolymer (ethylene content 12.5% by weight, MFR 45 g/10 min.)
  Crystalline propylene-ethylene random copolymer (crystalline propylene-ethylene-butene terpolymer: ethylene content 4.5% by weight, butene content 4.5% by weight, MFR 50 g/10 min.)

Antioxidant
  Phenolic antioxidant ("Sumilizer GM" and "Sumilizer TP-D", both trademarks of products manufactured by Sumitomo Chemical Company, Ltd.)

Free-radical generator
  1,3-bis(t-butylperoxypropyl)benzene
Inorganic filler
  Calcium carbonate
With regard to testing methods:
MFR [g/10 min.]
  according to JIS-K-6758; load 2.16 Kg, 230° C.
Flexural modulus [Kg f/cm²]
  according to JIS-K-7203
Dupont high-impact strength (Chisso process)
  Employing a Dupont high-impact tester (manufactured by Toyo Seiki Company) (a tip end of center of impact of ¼ inch R and a pad for the center of impact, of 3/2 inch R), a load of 3.8 Kg was dropped from the height of 1 m to observe the presence or absence of ductile failure. The measurement temperature at that time was −40° C.
Appearance
  Injection molding was carried out employing NEO-MAT N 350/120 type injection molding machine (trademark of product manufactured by SUMITOMO HEAVY INDUSTRIES, LTD.) and under conditions of
  Mold: flat plate of 150×150×3 mm
  Injection temperature: 250° C.
  Mold temperature: 50° C.
  The appearance of the resulting flat plate was judged by the naked eye, and when silver streaks or flow marks were not observed, the appearance of the molded product was regarded good.
Luster (%)
  according to JIS-Z-7841.

mixture by means of a single screw extruder (manufactured by Thermoplastic Company) at 200° C. into pellets. With the pellets, the melt flow rate (MFR) indicated below was measured, and test pieces prepared therefrom were subjected to various tests.

Further, in the case of Comparative examples 7∼11, the respective components of kind and quantity indicated in Table 2 were stirred in the same manner as in Examples 9∼13 to obtain pellets. With the pellets, the melt flow rate was measured and various tests were carried out. The results of the respective Examples and Comparative examples are shown in Table 2.

In addition, the respective components used in the Examples and Comparative examples and the testing methods employed therein will be described below.
With regard to the blending components:
Hydrogenated derivative of block copolymer (the fourth component)
  Hydrogenated product of SBS copolymer ("Kraton G-1652", trademark of a product manufactured by Shell Chemical Company; solution viscosity, 550 cps as measured in 20% by weight toluene solution at 25° C.) and ("Kraton G-1650", trademark of a product manufactured by the same company; solution viscosity, 1,100 cps as measured in 20% by weight toluene solution at 25° C.)
Crystalline propylene-ethylene random copolymer (the fifth component)
  a crystalline propylene-ethylene-butene random terpolymer (ethylene content 4.5% by weight, butene content 4.5% by weight) (MFR=42 g/10 min., flexural modulus=6,000 Kg f/cm²).

TABLE 1

|  | Example |  |  |  |  |  |  |  | Comparative example |  |  |  |  |  |
|---|---|---|---|---|---|---|---|---|---|---|---|---|---|---|
|  | 1 | 2 | 3 | 4 | 5 | 6 | 7 | 8 | 1 | 2 | 3 | 4 | 5 | 6 |
| 1st component Copolymer (wt %) | 11 | 11 | 11 | 11 | 15 | 15 | 40 | 30 | 11 | 40 | 30 | 30 | 30 | 30 |
| 2nd component Non-crystalline ethylene-propylene random copolymer (wt %) | 26 | 26 | 26 | 26 | 30 | 30 | 10 | 10 | 26 | — | 10 | 10 | 10 | 10 |
| 3rd component |  |  |  |  |  |  |  |  |  |  |  |  |  |  |
| Propylene-ethylene block copolymer (wt %) | 63 | 63 | 63 | 63 | 55 | — | 50 | 60 | 63 | 60 | 60 | 60 | 40 | 40 |
| Crystalline propylene-ethylene random copolymer (wt %) | — | — | — | — | — | 55 | — | — | — | — | — | — | — | — |
| Antioxidant |  |  |  |  |  |  |  |  |  |  |  |  |  |  |
| Sumilizer-GM (part) | 0.3 | 0.6 | 0.9 | 0.2 | 0.3 | 0.3 | 0.3 | 0.3 | — | — | — | — | — | — |
| Sumilizer-TP-D (part) | — | — | — | 0.2 | — | — | — | — | — | — | — | — | — | — |
| Radical generator (part) | — | — | — | — | — | — | — | — | — | — | 0.025 | 0.025 | 0.025 | 0.01 |
| Inorganic filler (wt %) | — | — | — | — | — | — | — | — | — | — | — | — | 20 | 20 |
| MFR (g/10 min.) | 20 | 22 | 24 | 20 | 12 | 17 | 8 | 12 | 8 | 6 | 1 | 1 | 0.2 | 0.3 |
| Flexural modulus (Kg f/cm²) | 5430 | 5750 | 5750 | 5430 | 4390 | 3500 | 4000 | 4800 | 5270 | 5670 | 4960 | 3140 | 2530 | 2660 |
| Dupont high-impact strength[1] | O | O | O | O | O | O | O | O | O | O | O | X | O | O |
| Apperance[2] | O | O | O | O | O | O | O | O | X | X | X | X | X | X |
| Luster (%) | 93 | 95 | 92 | 94 | 92 | 95 | 92 | 94 | 71 | 72 | 70 | 26 | 16 | 17 |

Note:
[1] O: not broken, X: broken
[2] O: no silver streak and flow mark, X: silver streak or flow mark, present

EXAMPLES 9∼13 AND COMPARATIVE EXAMPLES 7∼11

A hydrogenated derivative of a block copolymer as the fourth component of kind and quantity indicated in Table 2, a crystalline propylene-ethylene random copolymer as the fifth component of quantity indicated in Table 2 and a non-crystalline ethylene-propylene random copolymer of quantity indicated in Table 2 (Examples 11 to 13) were stirred by means of Henschel mixer (trademark) for 3 minutes, followed by extruding the Non-crystalline ethylene-propylene random copolymer "EPO2P" (tradename of a product manufactured by Japan Synthetic Rubber Co., Ltd.) (Mooney viscosity $M_{1+4}^{100}$=24).
Propylene-ethylene block copolymer
  (Ethylene content 12.5% by weight) (MFR=45 g/10 g). With regard to testing methods:
MFR (g/10 min.)
  according to JIS-K-6758 (load 2.16 Kg, 230° C.).
Flexural modulus (Kg f/cm²)

according to JIS-K-7203 (23° C.)

Dupont impact strength (Chisso process)

This measurement method is the same as described above.

Tear strength (Kg f/cm²)
according to JIS-K-6301 (23° C.)

Appearance

Injection molding was carried out employing IS200B type injection molding machine (tradename of product manufactured by TOSHIBA MACHINE CO., LTD.), and under conditions of
Mold: flat plate of 400×80×3 mm
Injection temperature: 230° C.
Mold temperature: 30° C.

The appearance of the resulting flat plate was judged by the naked eye, and when silver streaks or flow marks were not observed, the appearance of the molded product was regarded good.

Moldability (mold-release characteristics)

Injection molding was carried out employing IS200B type injection molding machine and under the conditions of
Molding temperature: 230° C.
Injection pressure: 600 Kg f/cm²
Pressure keeping and cooling times: 20 sec.·20 sec.
Mold temperature: 30° C.
Mold: cage mold,
and the mold-release characteristics at the time of injection molding was judged by naked eyes.

TABLE 2

|  | Example | | | | | Comparative example | | | | |
|---|---|---|---|---|---|---|---|---|---|---|
|  | 9 | 10 | 11 | 12 | 13 | 7 | 8 | 9 | 10 | 11 |
| Crystalline propylene-ethylene random copolymer (wt %) | 65 | 55 | 55 | 60 | 65 | 45 | 55 | 55 | — | — |
| Propylene-ethylene block copolymer (wt %) | — | — | — | — | — | — | — | — | 55 | 55 |
| Kraton G 1652 (wt %) | 35 | 45 | 15 | 15 | 15 | 55 | — | — | 45 | — |
| Kraton G 1650 (wt %) | — | — | — | — | — | — | 45 | — | — | — |
| Non-crystalline ethylene-propylene random copolymer (wt %) | — | — | 30 | 25 | 20 | — | — | 45 | — | 45 |
| MFR (g/10 min.) | 16 | 10 | 17 | 18 | 20 | 7.7 | 6 | 19 | 10 | 17 |
| Flexural modulus (Kg f/cm²) | 3600 | 2900 | 2800 | 3600 | 3800 | 2500 | 2800 | 2800 | 3600 | 3600 |
| Dupont high-impact properties[1] | O | O | O | O | O | O | O | O | O | O |
| Tear strength (Kg f/cm²) | 115 | 105 | 115 | 125 | 135 | 95 | 115 | 108 | 100 | 70 |
| Appearance[2] | O | O | O | O | O | X | X | O | X | X |
| Mold-release characteristics | good | good | good | good | good | good | good | bad | good | bad |

Note:
[1] O: not broken, X: broken
[2] O: no silver streak and flow mark; X: silver streak or flow mark, present

What is claimed is:

1. A molding elastomeric resin composition having the components (a), (b), (c), and (d) in which the quantity of each component is based on the total weight of components (a), (b), and (c) comprising:

(a) 1 to 50% of a block copolymer expressed by the formula (I)

$$B-A-B' \qquad (I)$$

wherein A represents a conjugated diene polymer block and B and B' each represent an aromatic vinyl compound polymer block having a number-average molecular weight of 5,000 to 125,000, B and B' are the same or different and the total weight of B and B' present in the copolymer is in an amount of 5 to 50% by weight;

(b) no more than 50% of a non-crystalline ethylene-α-olefin random copolymer wherein the carbon number of the α-olefin is 3 or more;

(c) 40 to 90% of at least one of a propylene-ethylene block copolymer and a crystalline propylene-ethylene random copolymer; and (d) 0.01 to 5 parts of a phenolic antioxidant expressed by the formula (II)

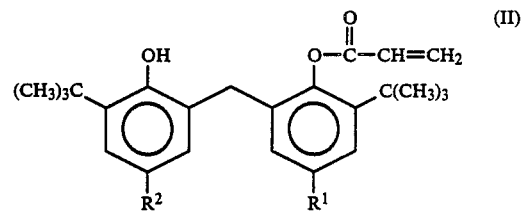

based on a total of 100 parts of components (a), (b), and (c), wherein $R^1$ and $R^2$ each represent a lower alkyl group of 1 to 4 carbon atoms.

2. A molding elastomeric resin composition according to claim 1 wherein said A is polybutadiene block or polyisoprene block and said B and B' are both polystyrene blocks.

3. A molding elastomeric resin composition according to claim 1, further including an additional antioxidant expressed by the formula $$(R^3-S-CH_2CH_2COOCH_2)_4C$$

wherein $R^3$ represents an alkyl group of 4 to 20 carbon atoms.

4. A molding elastomeric resin composition according to claim 1 wherein said A is a polybutadiene block or a polyisoprene block present in component (a) in a proportion of about 95 to about 50% and said B and B' are both polystyrene blocks.

* * * * *